US012734102B2

(12) United States Patent
Ma et al.

(10) Patent No.: US 12,734,102 B2
(45) Date of Patent: Sep. 15, 2026

(54) VIBRATING MASSAGE RING

(71) Applicants: SHENZHEN OLIVIA INTERNATIONAL TRADING CO., LTD, Shenzhen City (CN); DONGGUAN ERYI INTELLIGENT TECHNOLOGY CO., LTD, Dongguan City (CN)

(72) Inventors: Haowei Ma, Shenzhen City (CN); Guokai Wang, Shenzhen City (CN)

(73) Assignees: SHENZHEN OLIVIA INTERNATIONAL TRADING CO., LTD, Shenzhen City (CN); DONGGUAN ERYI INTELLIGENT TECHNOLOGY CO., LTD, Dongguan City (CN)

( * ) Notice: Subject to any disclaimer, the term of this patent is extended or adjusted under 35 U.S.C. 154(b) by 0 days.

(21) Appl. No.: 19/177,644

(22) Filed: Apr. 14, 2025

(65) Prior Publication Data

US 2026/0248681 A1 Aug. 27, 2026

(30) Foreign Application Priority Data

Feb. 27, 2025 (CN) ........................ 202520345536.0

(51) Int. Cl.
*A61H 19/00* (2006.01)
*A61H 23/02* (2006.01)

(52) U.S. Cl.
CPC ......... *A61H 19/32* (2013.01); *A61H 23/0254* (2013.01); *A61H 2201/0192* (2013.01); *A61H 2201/1215* (2013.01); *A61H 2201/169* (2013.01); *A61H 2201/1692* (2013.01); *A61H 2205/087* (2013.01)

(58) Field of Classification Search
CPC ................ A61H 19/32; A61H 23/0254; A61H 2201/0192; A61H 2201/1215; A61H 2201/169; A61H 2201/1692; A61H 2205/087
USPC ........................................................... 600/38
See application file for complete search history.

(56) References Cited

U.S. PATENT DOCUMENTS

| | | | | |
|---|---|---|---|---|
| 8,998,795 B2 * | 4/2015 | Zamar | A61H 19/30 600/38 |
| 10,052,256 B2 * | 8/2018 | Wang | A61H 23/02 |
| 11,253,387 B2 * | 2/2022 | Xu | A61F 5/41 |
| 2002/0022760 A1 * | 2/2002 | Orten | A61H 19/50 600/38 |
| 2003/0083598 A1 * | 5/2003 | Kobayashi | A61H 19/32 601/DIG. 16 |

(Continued)

FOREIGN PATENT DOCUMENTS

CA 2698817 A1 * 10/2010 ......... A61H 23/0254

*Primary Examiner* — Brian L Casler
(74) *Attorney, Agent, or Firm* — Li & Cai Intellectual Property Office

(57) ABSTRACT

A vibrating massage ring relating to the technical field of massagers, including: an annular body and a vibrating massage assembly. The annular body has a ring hole configured to tighten around a male genitalia, and the vibrating massage assembly is disposed on an inner wall of the ring hole and extends radially along the ring hole, in which the vibrating massage assembly is pushed out of the ring hole and elastically abutted against an outer periphery of the male genitalia when the annular body is fitted onto the male genitalia.

9 Claims, 4 Drawing Sheets

(56) References Cited

U.S. PATENT DOCUMENTS

| | | | | |
|---|---|---|---|---|
| 2004/0133070 | A1* | 7/2004 | Lin | A61H 23/0254 600/38 |
| 2004/0152948 | A1* | 8/2004 | Kim | A61F 5/41 600/38 |
| 2013/0158446 | A1* | 6/2013 | Nan | A61H 23/0263 601/46 |
| 2013/0296645 | A1* | 11/2013 | Evans | A61H 19/40 600/41 |
| 2015/0157531 | A1* | 6/2015 | Sedic | A61H 19/40 601/46 |

* cited by examiner

VIBRATING MASSAGE RING

FIELD OF THE DISCLOSURE

The present disclosure relates to the field of massage devices, specifically to a vibrating massage ring.

BACKGROUND OF THE DISCLOSURE

To enhance the quality of intimacy between partners, existing technologies have introduced male massage rings that are worn and tightened around the male genital organ. These rings apply pressure to the internal veins, preventing blood from flowing back, thereby helping to maintain an erection.

A Chinese invention patent with Patent number "CN100360106C" discloses a male function auxiliary ring. The ring body of the male function auxiliary ring is made of a soft and highly stretchable elastic material and features a protruding section in which a small electric massager is embedded. While this existing technology has achieved some success in enhancing massage comfort for both partners, it also has certain drawbacks. For example, the protruding section extends outward from the ring body, thus making its external contour larger, such that it increases the packaging space required and thus raises packaging costs.

Therefore, there is a need to design a vibrating massage ring with a smaller external contour to reduce packaging costs.

SUMMARY OF THE DISCLOSURE

The purpose of the present disclosure is to address the defects and drawbacks of the existing technology by providing a vibration massage ring, which at least solves one of the technical problems, and features a smaller external contour, thereby reducing packaging costs.

In order to achieve the aforementioned purpose, the present disclosure provides a vibrating massage ring, including: an annular body having a ring hole configured to tighten around a male genitalia; and a vibrating massage assembly disposed on an inner wall of the ring hole and extending radially along the ring hole; wherein the vibrating massage assembly is pushed out of the ring hole and elastically abutted against an outer periphery of the male genitalia when the annular body is fitted onto the male genitalia.

Optionally, the vibrating massage ring further includes: a vibration module; wherein the vibration module includes: a first vibration motor disposed in the vibrating massage assembly, a control motherboard, a power source and a contact switch correspondingly disposed in the annular body; and wherein the control motherboard is electrically connected to the first vibration motor; the power source supplies power to the control motherboard and the first vibration motor, and the contact switch is electrically connected to the control motherboard.

Optionally, the annular body is made of an elastic material, and a cross-sectional thickness of the annular body gradually decreases from one side to another side; and the control motherboard, the power source, and the contact switch are all disposed on a side of the annular body that has a greater cross-sectional thickness.

Optionally, the vibrating massage assembly is connected to the side of the annular body that has the greater cross-sectional thickness and extends toward a side of the annular body that has a smaller cross-sectional thickness.

Optionally, the vibrating massage assembly is a vibrating bead, and the vibrating bead includes: a connecting section connected to the annular body, and a spherical end extending from the connecting section.

Optionally, the vibration module further includes: two second vibration motors correspondingly disposed in the annular body and electrically connected to the control motherboard, and the two second vibration motors are symmetrically arranged relative to the vibrating massage assembly.

Optionally, the power source is a rechargeable battery, and a charging hole is provided on the annular body; and the vibrating massage ring further includes: a magnetic charging connector disposed in the annular body and corresponding to the charging hole.

Optionally, a surface of the vibrating massage assembly and an outer surface of the annular body both have a textured structure.

Optionally, the annular body is entirely circular or lip-shaped.

Optionally, the annular body includes: a first collar and a second collar that are spaced apart and partially connected to each other, and wherein the vibrating massage assembly is installed on an inner wall of the ring hole of the first collar or the second collar.

The advantages of the present disclosure over the prior art are as follows.

Since the vibrating massage assembly of the vibrating massage ring is disposed on the inner wall of the ring hole and extends radially along the ring hole, the vibrating massage assembly is pushed out of the ring hole and elastically abutted against the outer periphery of the male genitalia when the annular body is fitted onto the male genitalia. Thus, in a non-use state, the vibrating massage assembly remains inside the ring hole of the annular body, resulting in a smaller external contour of the vibrating massage ring. Therefore, the vibrating massage ring provided by the present disclosure reduces the required packaging space during packaging, thereby lowering packaging costs.

BRIEF DESCRIPTION OF THE DRAWINGS

To better illustrate the embodiments of the present disclosure or the technical solutions in prior art, the following brief introduction is provided regarding the necessary figures used in these descriptions. It should be understood that the figures described below only represent some embodiments of the present disclosure. A person skilled in the art can derive other figures based on the provided ones without engaging in creative labor.

REFERENCE NUMERAL

Figure 1:
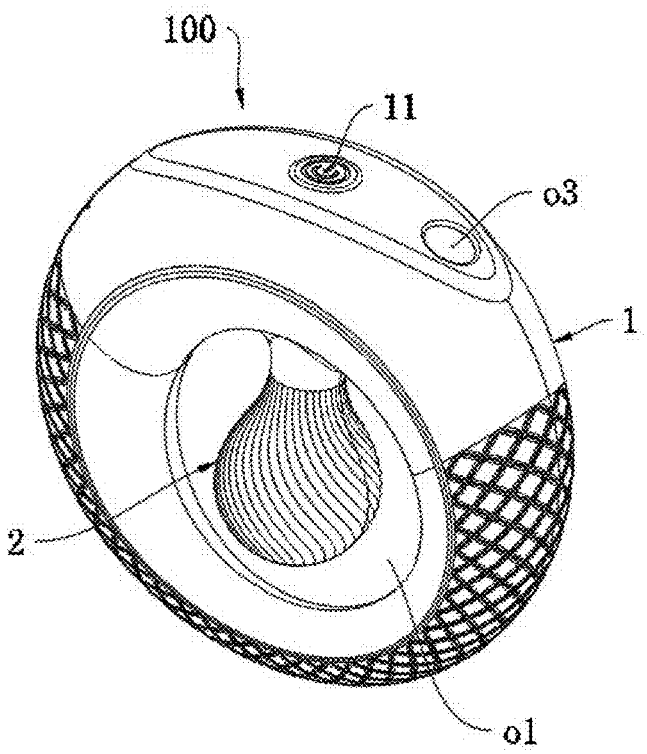
FIG. 1 is a schematic isometric structural view of an Embodiment 1 of the present disclosure.

100, Vibrating Massage Ring;

1, Annular Body; o1, Ring Hole; a, Second Assembly Cavity; b, Third Assembly Cavity; 11, Button; o2, Wire Hole; o, Charging Port;

2, Vibrating massage assembly; c, First Assembly Cavity; 21, Connecting Section; 22, Spherical End;

3, Vibration Module; 31, First Vibration Motor; 32, Control Circuit Board; 33, Power Supply; 34, Contact Switch; 35, Second Vibration Motor; 36, Magnetic Charging Connector;

4, Concave-Convex Texture Structure; 41, Striped Concave-Convex Texture Structure; 42, Grid-Shaped Concave-Convex Texture Structure.

DETAILED DESCRIPTION OF THE EXEMPLARY EMBODIMENTS

The following describes the technical solutions in the embodiments of the present disclosure in a clear and complete manner with reference to the accompanying figures. It should be noted that the described embodiments represent only a part of the present disclosure rather than its entirety. Based on the embodiments provided herein, those skilled in the art can derive other embodiments without departing from the scope of the present disclosure.

It should be noted that the directional terms used in the present disclosure, such as "center," "longitudinal," "transverse," "upper," "lower," "front," "rear," "left," "right," "top," "bottom," "inner," "outer," "back," "side," and "circumferential," are based on the orientation shown in the accompanying drawings. These terms are for ease of description and simplification rather than limiting the specific orientation, structure, or operation of the described devices or components. Additionally, terms like "first" and "second" are used solely to differentiate between multiple similar components or structures and do not imply any particular sequence or connection requirement.

Please refer to FIG. 1 to FIG. 5. Embodiments of the present disclosure provides a vibrating massage ring 100, including: an annular body 1 and a vibrating massage assembly 2.

The annular body 1 has a ring hole o1 configured to tighten around a male genitalia. Optionally, the annular body 1 is made of an elastic material, such as rubber or silicone, which is soft and has good stretchability, thereby allowing a diameter of the ring hole o1 to be adjustable so as to tighten around the male genitalia.

The vibrating massage assembly 2 is disposed on an inner wall of the ring hole o1 and extends radially along the ring hole o1. It is understandable that the vibrating massage assembly 2 is a structure capable of generating vibrations and has a partially spherical surface, and can provide vibrating massage to a contacted surface, thereby stimulating a target area.

When the annular body 1 is fitted onto the male genitalia, the vibrating massage assembly 2 is pushed out of the ring hole o1 and elastically abutted against an outer periphery of the male genitalia. That is, when the annular body 1 is placed around the male genitalia, the vibrating massage assembly 2 is pushed out of the ring hole o1 and positioned on one side of the annular body 1, with one side of the vibrating massage assembly 2 being elastically abutted against the outer periphery of the male genitalia.

Thus, in a non-use state, the vibrating massage assembly 2 is located inside the ring hole o1 of the annular body 1, thus making an external contour of the vibrating massage ring 100 smaller. Therefore, it reduces the required packaging space during packaging, thereby lowering packaging costs. In a use state, the vibrating massage assembly 2 is pushed out of the ring hole o1 and elastically abutted against the outer periphery of the male genitalia, thereby achieving vibrating massage of the contacted area and providing a better massage experience.

Figure 4:
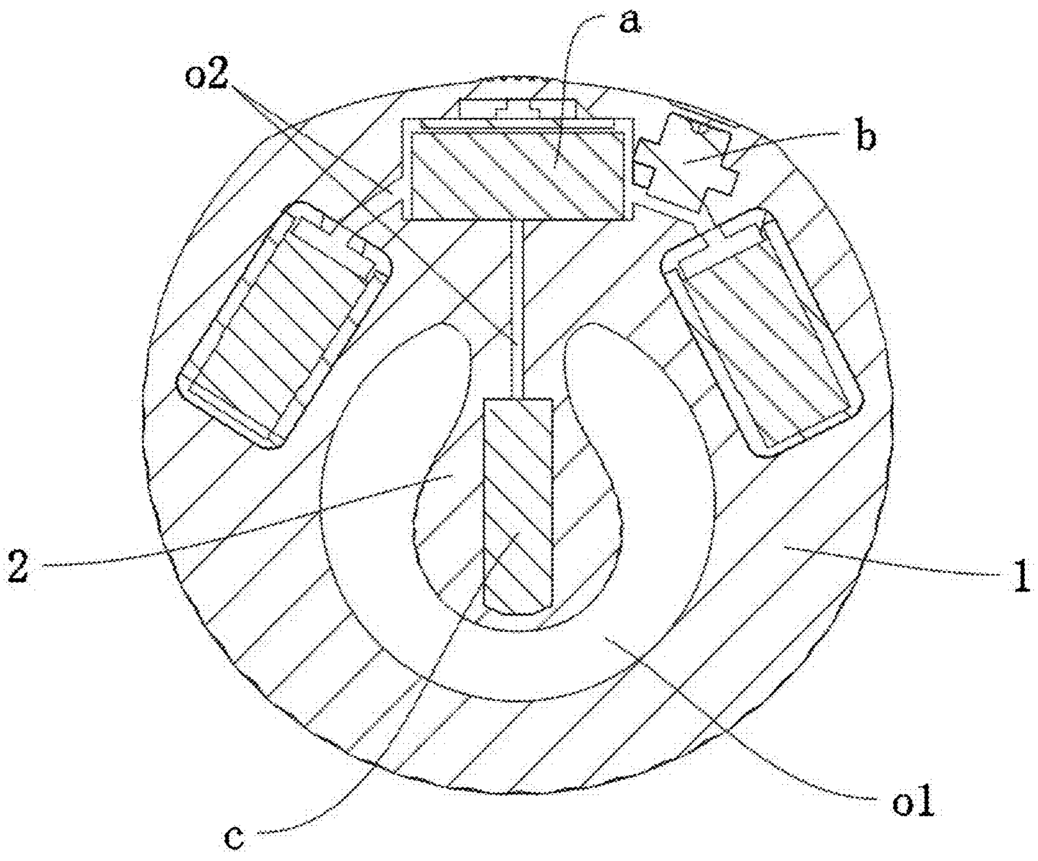
FIG. 4 is a schematic cross-sectional structural view along the A-A line in FIG. 3.
Figure 5:
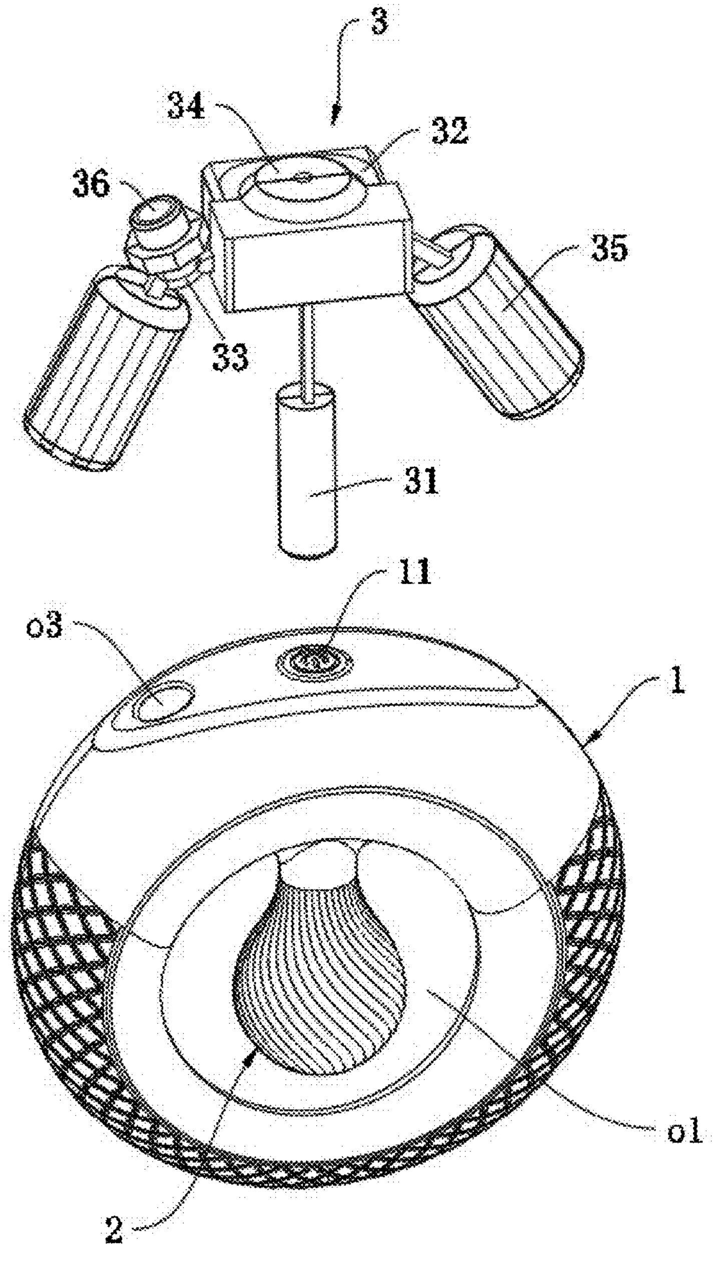
FIG. 5 is a schematic partially exploded view of the Embodiment 1.

Optionally, referring to FIG. 4 and FIG. 5, in the present embodiment, the vibrating massage ring 100 further includes a vibration module 3. The vibration module 3 includes: a first vibration motor 31, a control motherboard 32, a power source 33, and a contact switch 34. The first vibration motor 31 is disposed in the vibrating massage assembly 2. Specifically, a first assembly cavity c is provided in the vibrating massage assembly 2 along a length direction of the vibrating massage assembly 2. The first vibration motor 31 is tightly fitted in the first assembly cavity c. The control motherboard 32, the power source 33, and the contact switch 34 are correspondingly disposed in the annular body 1. The control motherboard 32 is electrically connected to the first vibration motor 31, the power source 33 supplies power to the control motherboard 32 and the vibration motor 31, and the contact switch 34 is electrically connected to the control motherboard 32.

Specifically, a second assembly cavity a and a third assembly cavity b are provided in the annular body 1. The control motherboard 32 and the contact switch 34 are correspondingly installed in the second assembly cavity a, while the power source 33 is installed in the third assembly cavity b. A surface of the annular body 1 is provided with a button 11 corresponding to the contact switch 34. A wiring hole o2 is provided between the first assembly cavity c and the second assembly cavity a, as well as between the second assembly cavity a and the third assembly cavity b, thereby facilitating wire connections and routing.

Figure 2:
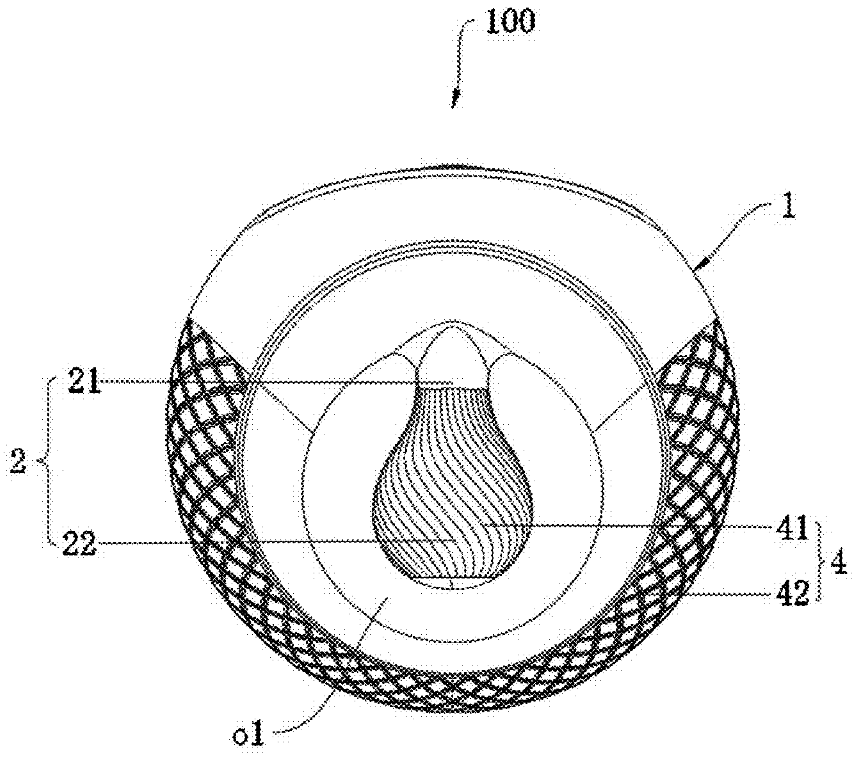
FIG. 2 is a schematic front structural view of the Embodiment 1.
Figure 3:
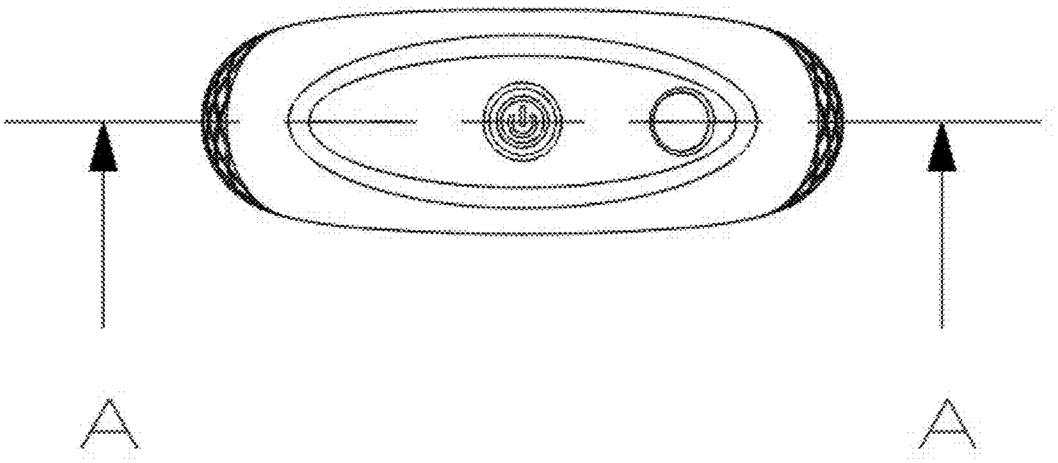
FIG. 3 is a top-down view of an annular body in Embodiment 1.

Optionally, referring to FIG. 2, FIG. 4 and FIG. 5, in the present embodiment, to facilitate an assembly of the vibration module 3 while avoiding an excessively large overall size of the annular body 1 and improving an elastic expansion of the ring hole o1, the annular body 1 is made of the elastic material, and a cross-sectional thickness of the annular body 1 gradually decreasing from one side to another side. The control motherboard 32, the power source 33, and the contact switch 34 are all disposed on a side of the annular body 1 that has a greater cross-sectional thickness, as such the side provides sufficient space for setting up the second assembly cavity a and the third assembly cavity b. In addition, a side of the annular body 1 that is farther from the second assembly cavity a and the third assembly cavity b has a smaller cross-sectional thickness, which helps to reduce an overall volume of the vibrating massage ring 100 and prevents discomfort during wear. Additionally, the side of the annular body 1 that has the smaller cross-sectional thickness is more prone to elastic expansion, so as to increase the diameter of the ring hole o1 and improve wearing comfort.

Optionally, referring to FIG. 2, in the present embodiment, the vibrating massage assembly 2 is connected to the side of the annular body 1 that has the greater cross-sectional thickness and extends toward the side of the annular body 1 that has the smaller cross-sectional thickness. Specifically, the vibrating massage assembly 2 is a vibrating bead, which includes: a connecting section 21 connected to the annular body 1 and a spherical end 22 extending from the connecting section 21. The connecting section 21 of the vibrating bead is connected to the side of the annular body 1 that has the greater cross-sectional thickness to ensure a strong connection.

Optionally, referring to FIG. 5, in the present embodiment, to enhance the massage effect, the vibration module 3 further includes two second vibration motors 35. The two second vibration motors 35 are correspondingly disposed in the annular body 1 and are electrically connected to the control motherboard 32. Moreover, the two second vibration motors 35 are symmetrically arranged relative to the vibrating massage assembly 2, thereby achieving vibrating massage on different areas and enhancing the massage effect.

Optionally, referring to FIG. 5, in the present embodiment, the power source 33 is a rechargeable battery, and the annular body 1 is provided with a charging hole o3. The vibrating massage ring 100 further includes a magnetic charging connector 36 disposed in the annular body 1 and corresponding to the charging hole o3. In this way, the rechargeable battery can be charged via the magnetic charging connector 36, so as to extend the usage time of the vibrating massage ring 100.

Optionally, referring to FIG. 5, in the present embodiment, to further enhance the massage experience, both a surface of the vibrating massage assembly 2 and an outer surface of the annular body 1 have textured structures 4. Specifically, the surface of the vibrating massage assembly 2 adopts a striped concave-convex texture structure 41, while the outer surface of the annular body 1 has a grid-shaped concave-convex texture structure 42. Such a design helps to improve the comfort and effectiveness of the massage.

Optionally, referring to FIG. 2, in the present embodiment, the annular body 1 is entirely circular in shape.

Embodiment 2

Figure 6:
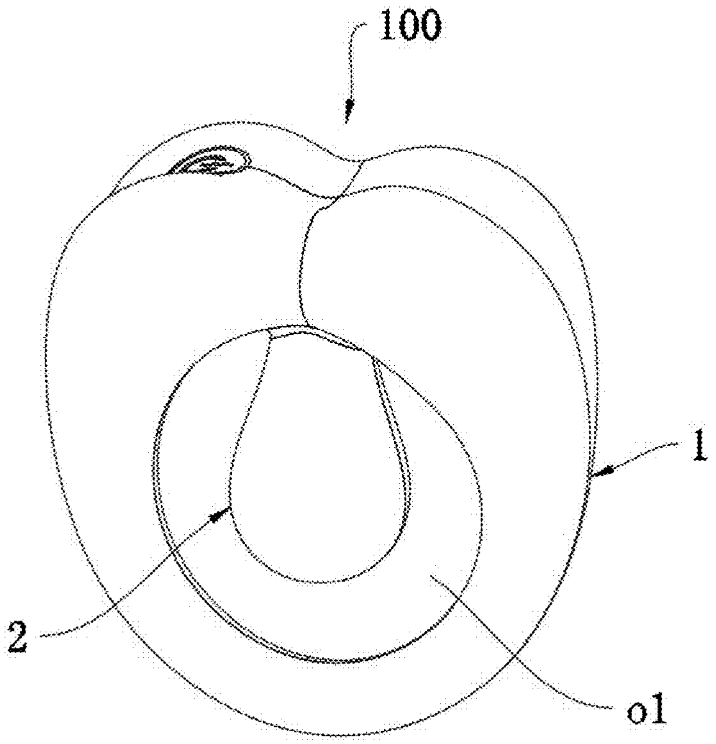
FIG. 6 is a schematic isometric structural view of an Embodiment 2.

Referring to FIG. 6, the present embodiment is basically the same as Embodiment 1, and the only difference is that the annular body 1 is lip-shaped as a whole, thereby making the vibration massage ring 100 more beautiful.

Embodiment 3

The present embodiment is essentially the same as Embodiment 1, with the only difference being that the annular body 1 includes: a first collar (not shown in the figures) and a second collar (not shown in the figures) that are spaced apart and partially connected to each other. The vibrating massage assembly 2 is installed on the inner wall of the ring hole o1 of the first collar or the second collar. In this way, by separately tightening different positions of the male genitalia through the first collar and the second collar, a better tightening effect is achieved.

Finally, it should be noted that the above embodiments are provided solely to illustrate the technical solution of the present disclosure and not to impose any limitations. Although the present disclosure has been described in detail with reference to the aforementioned embodiments, those skilled in the art should understand that modifications can still be made to the technical solutions described in the foregoing embodiments, or some or all of the technical features can be replaced with equivalents. Such modifications or replacements do not depart from the essence of the technical solutions of the respective embodiments of the present disclosure.

What is claimed is:

1. A vibrating massage ring, comprising:
an annular body (1) having a ring hole (o1) configured to tighten around a male genitalia; and
a vibrating massage assembly (2) disposed on an inner wall of the ring hole (o1) and extending radially along the ring hole (o1);
wherein the vibrating massage assembly (2) is pushed out of the ring hole (o1) and elastically abutted against an outer periphery of the male genitalia when the annular body (1) is fitted onto the male genitalia;
wherein the vibrating massage assembly (2) is a vibrating bead, and the vibrating bead includes: a connecting section (21) connected to the annular body (1), and a spherical end (22) extending from the connecting section (21).

2. The vibrating massage ring according to claim 1, further comprising:
a vibration module (3);
wherein the vibration module (3) includes: a first vibration motor (31) disposed in the vibrating massage assembly (2), a control motherboard (32), a power source (33) and a contact switch (34) correspondingly disposed in the annular body (1); and wherein
the control motherboard (32) is electrically connected to the first vibration motor (31);
the power source (33) supplies power to the control motherboard (32) and the first vibration motor (31), and
the contact switch (34) is electrically connected to the control motherboard (32).

3. The vibrating massage ring according to claim 2, wherein the annular body (1) is made of an elastic material, and a cross-sectional thickness of the annular body (1) gradually decreases from one side to another side; and the control motherboard (32), the power source (33), and the contact switch (34) are all disposed on a side of the annular body (1) that has a greater cross-sectional thickness.

4. The vibrating massage ring according to claim 3, wherein the vibrating massage assembly (2) is connected to the side of the annular body (1) that has the greater cross-sectional thickness and extends toward a side of the annular body (1) that has a smaller cross-sectional thickness.

5. The vibrating massage ring according to claim 4, wherein the vibration module (3) further includes: two second vibration motors (35) correspondingly disposed in the annular body (1) and electrically connected to the control motherboard (32), and the two second vibration motors (35) are symmetrically arranged relative to the vibrating massage assembly (2).

6. The vibrating massage ring according to claim 2, wherein the power source (33) is a rechargeable battery, and a charging hole (o3) is provided on the annular body (1); and the vibrating massage ring further comprises: a magnetic charging connector (36) disposed in the annular body (1) and corresponding to the charging hole (o3).

7. The vibrating massage ring according to claim 1, wherein a surface of the vibrating massage assembly (2) and an outer surface of the annular body (1) both have a textured structure (4).

8. The vibrating massage ring according to claim 1, wherein the annular body (1) is entirely circular or lip-shaped.

9. The vibrating massage ring according to claim 1, wherein the annular body (1) includes: a first collar and a second collar that are spaced apart and partially connected to each other, and wherein the vibrating massage assembly (2) is installed on an inner wall of the ring hole (o1) of the first collar or the second collar.

* * * * *